United States Patent
Miyatani

(10) Patent No.: US 9,563,816 B2
(45) Date of Patent: Feb. 7, 2017

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Sonoko Miyatani, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 32 days.

(21) Appl. No.: 14/624,474

(22) Filed: Feb. 17, 2015

(65) Prior Publication Data

US 2015/0254831 A1    Sep. 10, 2015

(30) Foreign Application Priority Data

Mar. 6, 2014  (JP) .................. 2014-044261

(51) Int. Cl.
| | | |
|---|---|---|
| G06K 9/00 | (2006.01) | |
| G06K 9/46 | (2006.01) | |
| G06K 9/52 | (2006.01) | |
| G06T 7/00 | (2006.01) | |

(52) U.S. Cl.
CPC .............. *G06K 9/52* (2013.01); *G06T 7/001* (2013.01); *G06T 2207/30164* (2013.01)

(58) Field of Classification Search
CPC .......... G06K 9/52; G06K 9/036; G06T 7/001; G06T 2207/30164; G06T 7/0004; G06T 7/004; G06T 2207/30148; G06T 7/0006; G01M 11/0278
USPC ....... 382/100, 154, 181, 190, 103, 276, 293, 382/294, 284, 118, 115, 215, 209, 141; 345/419, 418, 420; 348/42, 47, 46, 51, 348/61, 161
See application file for complete search history.

(56) References Cited

U.S. PATENT DOCUMENTS

| | | | | | |
|---|---|---|---|---|---|
| 6,064,759 | A | * | 5/2000 | Buckley | G01B 11/024 348/125 |
| 6,675,120 | B2 | * | 1/2004 | Pratt | G01N 21/95607 382/147 |
| 7,822,261 | B2 | * | 10/2010 | Moriya | G01N 21/8851 382/147 |
| 8,045,785 | B2 | * | 10/2011 | Kitamura | G06K 9/00 348/125 |
| 8,131,055 | B2 | * | 3/2012 | Clarke | G05B 19/41875 382/141 |
| 9,076,195 | B2 | * | 7/2015 | Mohammad | G06T 7/001 |

FOREIGN PATENT DOCUMENTS

JP    2008-170331 A    7/2008

OTHER PUBLICATIONS

Tarabanis, Konstantinos, A., et al., "A Survey of Sensor Planning in Computer Vision," IEEE Transaction on Robotics and Automation, vol. 11, No. 1, pp. 86-104, Feb. 1995.

* cited by examiner

*Primary Examiner* — Sheela C Chawan
(74) *Attorney, Agent, or Firm* — Fitzpatrick, Cella, Harper & Scinto

(57) ABSTRACT

An information processing apparatus comprises a first feature extraction unit configured to extract, as a first feature, a feature of a component assembly in which components are assembled for each of viewpoints; a second feature extraction unit configured to extract a feature of the components as a second feature for each of the viewpoints; and a determination unit configured to determine, based on the first feature and the second feature, a viewpoint for inspecting an assembled state of the components.

15 Claims, 6 Drawing Sheets

X : FEATURE

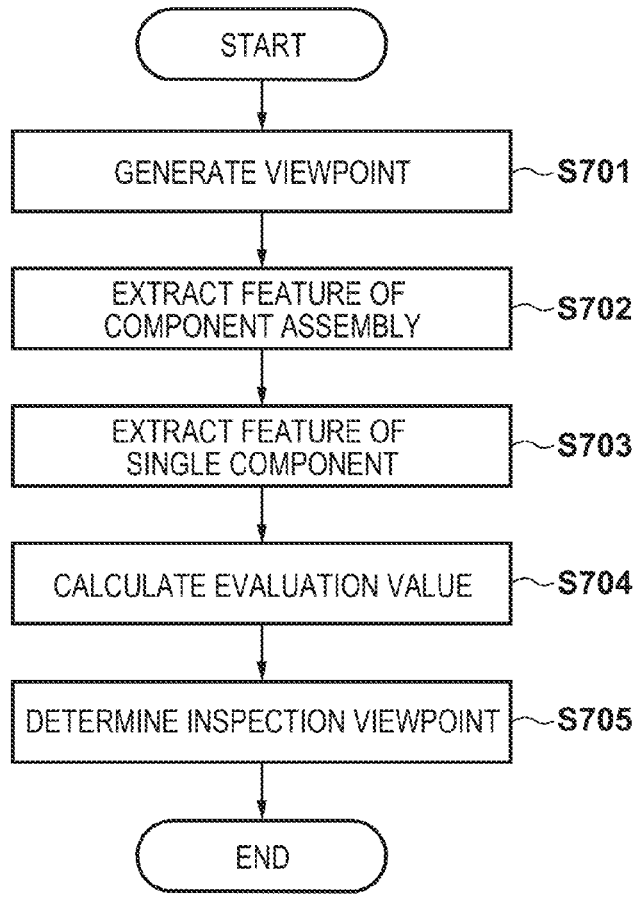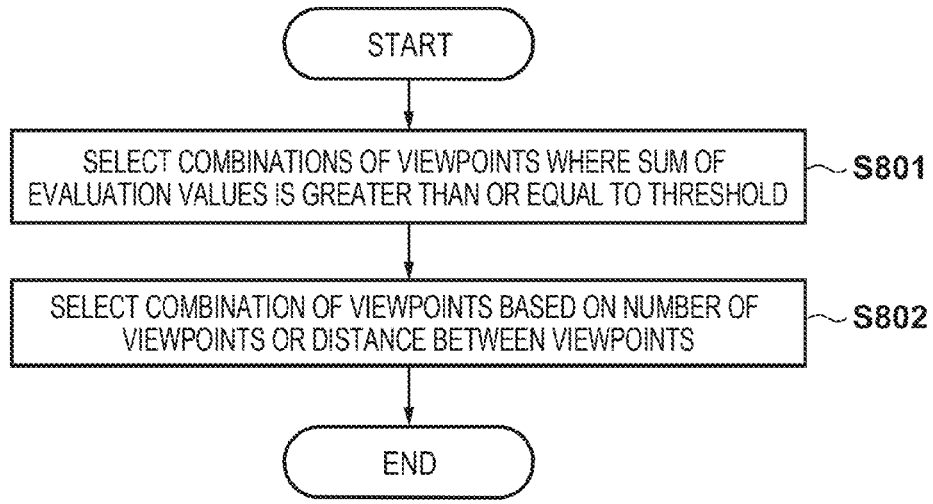

INFORMATION PROCESSING APPARATUS, METHOD FOR CONTROLLING INFORMATION PROCESSING APPARATUS, AND STORAGE MEDIUM

BACKGROUND OF THE INVENTION

Field of the Invention

The present invention relates to an information processing apparatus, a method for controlling the information processing apparatus, and a storage medium, and more particularly, to a technique for evaluating the position of a viewpoint for inspecting assembly of components.

Description of the Related Art

On production sites, robot-based automation has been increased in order to achieve an improved productivity. Examples thereof include automation of assembly inspection for judging whether components have been assembled normally. Japanese Patent Laid-Open No. 2008-170331 discloses a method in which whether a correct component is assembled is judged based on a correlation value between a pre-captured master image serving as a reference for a component to be assembled and an actual image captured at the time of completion of assembly of the component.

In addition, methods have been proposed in which a viewpoint that enables information sufficient for inspection to be obtained is automatically determined from prior information that is obtained in advance. In Konstantinios A., "A Survey of Sensor Planning in Computer Vision", IEEE TRANSACTION ON ROBOTICS AND AUTOMATION, VOL 11, NO. 1, FEBRUARY 1995, a method is disclosed in which CAD models are used as the prior information, and viewpoints for inspecting a defect or the like of a component are determined using the ratio of the number of features extracted from the entire component and the number of features observed for each viewpoint as one index.

However, with the techniques disclosed in Japanese Patent Laid-Open No. 2008-170331 and Konstantinios A., "A Survey of Sensor Planning in Computer Vision", IEEE TRANSACTION ON ROBOTICS AND AUTOMATION, VOL 11, NO. 1, FEBRUARY 1995, there is the risk that observation data sufficient for assembly inspection cannot be obtained for a component assembly depending on the viewpoint due to concealment between the components.

The present invention has been made in view of the above-described problem. The present invention provides a technique for determining a viewpoint suitable for assembly inspection even in the case where concealment between the components occurs.

SUMMARY OF THE INVENTION

According to one aspect of the present invention, there is provided an information processing apparatus comprising: a first feature extraction unit configured to extract, as a first feature, a feature of a component assembly in which components are assembled for each of viewpoints; a second feature extraction unit configured to extract a feature of the components as a second feature for each of the viewpoints; and a determination unit configured to determine, based on the first feature and the second feature, a viewpoint for inspecting an assembled state of the components.

Further features of the present invention will become apparent from the following description of exemplary embodiments with reference to the attached drawings.

BRIEF DESCRIPTION OF THE DRAWINGS

FIG. 7 is a flowchart illustrating an inspection viewpoint determination procedure in the second embodiment.

FIG. 8 is a flowchart illustrating an inspection viewpoint determination procedure in a third embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A Visibility is a Sum Total of the Ratios of the Numbers of Features of Each Component In the first embodiment, a description will be given of an example in which a visibility indicating a degree to which each component (hereinafter referred to as "single component") constituting a component assembly can be observed is derived as an evaluation value for judging whether a viewpoint of inspecting an assembled state of the component assembly is appropriate or not. Here, let us assume an exemplary inspection method in which the three-dimensional position and orientation of each single component is estimated, and the assembled state is judged by comparing the estimated value with the correct value of the three-dimensional position and orientation.

Figure 1:
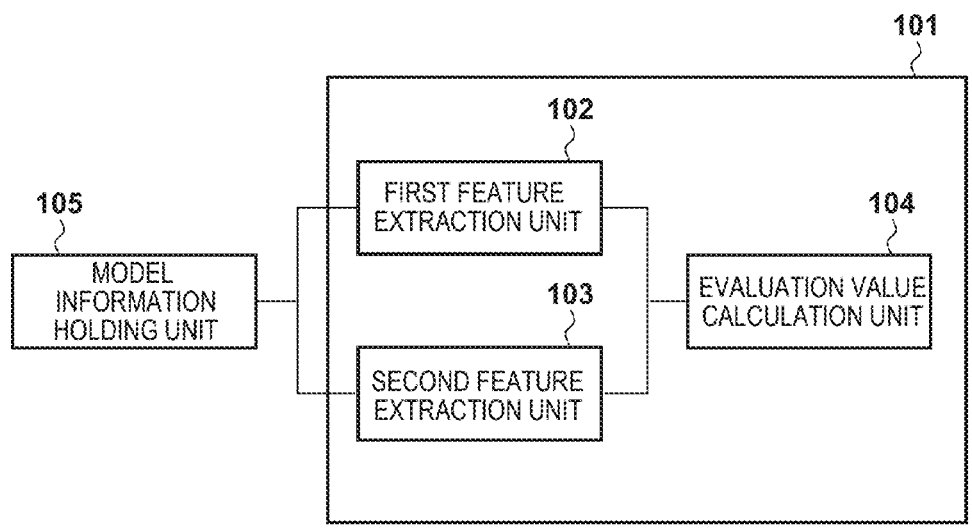
FIG. 1 is a diagram showing a configuration of an information processing system in a first embodiment.

FIG. 1 shows an exemplary configuration of an information processing system in the present embodiment. An information processing apparatus 101 includes a first feature extraction unit 102, a second feature extraction unit 103, and an evaluation value calculation unit 104, and the operations of various processing units are controlled by a CPU (not shown) reading and executing a program from a memory. A model information holding unit 105 is provided outside the information processing apparatus 101, and connects to the first feature extraction unit 102 and the second feature extraction unit 103. However, it is also possible to adopt a configuration in which the information processing apparatus 101 includes the model information holding unit 105.

The model information holding unit 105 holds three-dimensional shape models (shape information) of a component assembly and single components. The three-dimensional shape model may be any model as long as it holds three-dimensional geometric information representing the shape of a target component, and there is no particular limitation on the form of representation. The three-dimensional shape model may be represented in other forms of representation, including, for example, a polygon form represented by a set of planes and lines formed by three-dimensional points, a set of three-dimensional lines representing a ridge line, and a set of simple three-dimensional points. Further, the model information holding unit 105 may hold information on the relative position and orientation between the single components, instead of holding a three-dimensional shape model of the component assembly. In this case, a three-dimensional shape model of the component assembly is generated from the three-dimensional shape models of the single components and the information on the relative position and orientation between the single components.

The first feature extraction unit 102 extracts a geometric feature observed with a viewpoint targeted for evaluation from the three-dimensional shape model of the component assembly that is held by the model information holding unit 105. For example, an edge is extracted as the geometric feature. When the three-dimensional shape model is represented in the polygon form, a pixel position at which the difference between the luminance values of adjacent pixels is greater than or equal to a threshold is extracted as an edge from a brightness image generated by projecting the three-dimensional shape model on a two-dimensional screen with a viewpoint targeted for evaluation. Note that the feature to be extracted is not limited to an edge, and other geometric features may be used as long as they can be extracted from a three-dimensional shape model. For example, when the three-dimensional shape model is a set of three-dimensional points, a three-dimensional point observed with a viewpoint targeted for evaluation may be extracted as the feature.

The second feature extraction unit 103 extracts geometric features observed with the same viewpoint as the first feature extraction unit 102 or with a viewpoint in the vicinity thereof from the three-dimensional shape model of a single component that is held by the model information holding unit 105. The extraction method is the same as that used by the first feature extraction unit 102.

The evaluation value calculation unit 104 calculates a visibility (an evaluation value indicating a degree to which the three-dimensional position and orientation of the single component can be defined) indicating a degree to which the single component in the assembled state can be observed, based on the geometric feature of the component assembly that has been extracted by the first feature extraction unit 102 and the geometric feature of the single component that has been extracted by the second feature extraction unit 103. The visibility is, for example, a sum total of ratios of the numbers of the geometric features of single components of a component assembly to the numbers of the geometric features of the corresponding single components.

Figure 2:
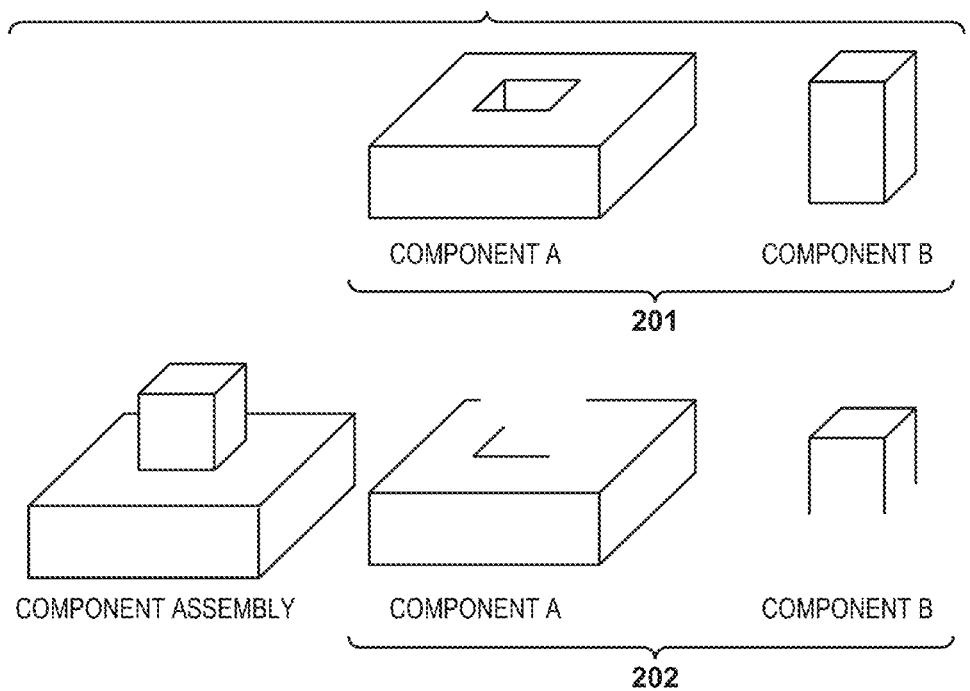
FIG. 2 is a diagram showing, in a simulated manner, results of observing components and a component assembly from a given viewpoint.

A specific example of the sum total of the ratios of the numbers of the features will be described below with reference to FIG. 2. Numeral 201 in FIG. 2 shows, in a simulated manner, edge features extracted from three-dimensional shape models of a component A and a component B. Numeral 202 in FIG. 2 shows, in a simulated manner, an edge feature extracted from the three-dimensional shape model of the component assembly, and edge features corresponding to the component A and the component B among the edge features of the component assembly. In the edge features of the component A and the component B of the component assembly shown in 202 in FIG. 2, there are locations that cannot be observed due to concealment between the components. If the numbers of features of the component A, the component A of the component assembly, the component B, and the component B of the component assembly are denoted by Na, Na', Nb, and Nb', respectively, the visibility is represented by Na'/Na+Nb'/Nb.

Figure 3:
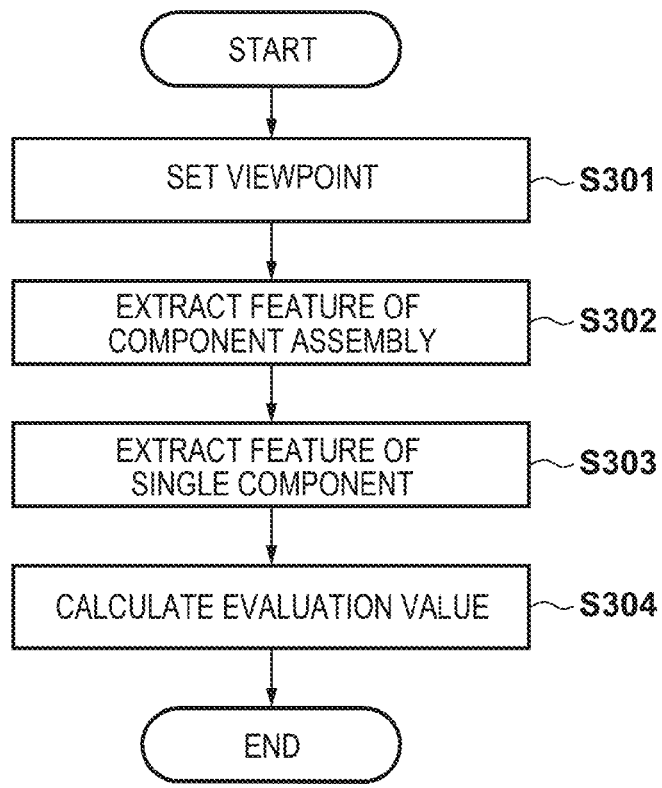
FIG. 3 is a flowchart illustrating a procedure of processing performed by the information processing apparatus in the first embodiment.

Next, the processing procedure in the present embodiment will be described. FIG. 3 is a flowchart illustrating the procedure of the processing performed by the information processing apparatus 101 according to the present embodiment.

(Step S301)

A viewpoint setting unit (not shown) sets a viewpoint targeted for evaluation. The viewpoint is represented by a vector connecting from the viewpoint to the component assembly. The magnitude and direction of the vector indicates the distance and direction from the component assembly to the viewpoint. Note that there is no limitation on the method for representing a viewpoint as long as the viewpoint can be uniquely represented. For example, a transformation matrix from a coordinate system set for the three-dimensional shape model of the component assembly to a coordinate system set for the viewpoint may be represented as a viewpoint.

Also, there is no limitation on the method for setting the viewpoint as long as the viewpoint can be set. For example, the information processing apparatus 101 may include a user interface for setting a viewpoint to be evaluated, and a user may freely set the viewpoint via the user interface.

(Step S302)

The first feature extraction unit 102 extracts a feature from the three-dimensional shape model of the component assembly that is held by the model information holding unit 105 with the viewpoint set at step S301. The method for extracting the feature is as described above.

(Step S303)

The second feature extraction unit 103 extracts a feature from the three-dimensional shape model of each single component that is held by the model information holding unit 105 at a location in the vicinity of the viewpoint set at step S301. The method for extracting the features is as described above.

(Step S304)

The evaluation value calculation unit 104 calculates, as an evaluation value of a viewpoint, a visibility indicating a degree to which each single component can be observed. The method for calculating the visibility is as described above.

As described above, an evaluation value for judging whether the viewpoint targeted for evaluation is appropriate as the viewpoint for inspecting the assembled state of the component assembly can be calculated by executing a series of processing from steps S301 to S304.

Thereafter, a viewpoint suitable for assembly inspection is determined based on the visibility calculated at step S304. For example, a viewpoint having a visibility greater than or equal to the threshold is determined as the viewpoint suitable for assembly inspection. Thereafter, the determined viewpoint is used to perform inspection such as checking to see whether the components are assembled correctly and whether there is any defect in the components.

<Variation 1; the Feature Amount is an Area>

Although geometric features are used as the features in the first embodiment, the present invention is not limited thereto, and the features may be other features as long as they are suitable for indicating a visibility indicating a degree to which a single component can be observed. For example, the size of a visible region of a single component may be used as the feature. The number of pixels on an image plane is used to represent the size of the visible region. The calculation method is as follows. First, a three-dimensional shape model of a component assembly is projected onto an image plane based on a viewpoint targeted for evaluation. Then, the number of pixels in a region corresponding to each single component on the image plane is calculated.

Note that the feature is not limited to the number of pixels on the image plane of the visible region of the single component, and other features may be used as long as they indicate the size of the visible region. For example, the area of the visible region in the three-dimensional shape model that is obtained by mapping the calculated visible region on the image plane to a three-dimensional shape of the single component may be used as the feature. Alternatively, a contour of the visible region on the image plane or the three-dimensional shape model may be extracted, and the length of the contour may be used as the feature.

<Variation 2; the Visibility is the Ratio of Areas or the Ratio of the Numbers of Pixels>

In the first embodiment, the visibility is a sum total of the ratios of the numbers of features of single components in an assembled state to the number of features of the corresponding single components. However, the present invention is not limited thereto, and other indices may be used as long as they indicate a degree to which single components can be observed.

For example, when the feature is the size of the visible region of a single component as described in Variation 1, the visibility may be a sum total of ratios of the sizes of the visible regions of single components in a component assembly to the sizes of the visible regions of the corresponding components. When the size of the visible region is an area or the number of pixels, the visibility is a sum total of the ratios of the areas or the numbers of pixels of the visible region of single components in a component assembly to the areas or the numbers of pixels of the visible regions of the corresponding single components.

<Variation 3; the Visibility is a Minimum Value of the Ratios of the Numbers of Features>

In the first embodiment, the visibility is a sum total of the ratios of the number of features of single components in an assembled state to the number of features of the single components. In Variation 2, the visibility is a sum total of the ratios of the sizes of visible regions of single components in a component assembly to the sizes of the visible regions of the single components. However, the present invention is not limited thereto, and other indices may be used as long as they indicate a degree to which single components can be observed. For example, the visibility may be a minimum value of the ratio of the number of features, among the ratios of the numbers of features of single components in an assembled state to the number of features of the corresponding single components.

<Variation 4; the Visibility is Calculated for Each Feature by Applying Weighting>

In the first embodiment, the visibility is a sum total of the ratios of the numbers of features of single components in an assembled state to the number of features of the corresponding single components. In Variation 2, the visibility is a sum total of the ratios of the sizes of visible regions of single components in a component assembly to the sizes of the visible regions of the corresponding single components. In Variation 3, the visibility is a minimum value of the ratios of the numbers of features obtained in the same manner as in the first embodiment. However, the present invention is not limited thereto, and other indices may be used as long as they indicate a degree to which single components in an assembled state can be observed.

For example, the ratio of the numbers of features (or the sizes of the visible regions) may be calculated by weighting the number of features (the sizes of the visible regions). The weighting may be set for each component, or may be set for each location of a component. For example, if the numbers of features (or the sizes of the visible regions) of the component A, the component A of the component assembly, the component B, and the component B of the component assembly are denoted by Na, Na', Nb, and Nb', respectively, and the weight for the features extracted from the component A is set to Wa and the weight for the features extracted from the component B is set to Wb, then the visibility is represented by Wa×(Na'/Na)+Wb×(Nb'/Nb). If Wa=1.0 and Wb=0.0, then the visibility only for the component A is obtained. The weighting may be configured such that a large weight is assigned to a component having a significant influence on assembly inspection, and a small weight is assigned to a component having a small influence on assembly inspection.

<Variation 5; the Distribution Degree of Features is Taken into Consideration>

In the first embodiment and Variations 2 to 4, the visibility indicating a degree to which single components in an assembled state can be observed is calculated as an evaluation value of a viewpoint for inspecting the assembled state. However, the present invention is not limited thereto, and other indices may be used as long as they indicate a degree to which the three-dimensional position and orientation of single components is defined.

For example, a distribution degree indicating a degree of spatial distribution of the feature of a single component may be calculated as an evaluation value of a viewpoint. The method for obtaining the distribution degree is as follows. First, the principal axis direction of the feature of each single component is obtained. Then, the ratio of the difference between a maximum value and a minimum value of the feature of the single component in an assembled state to the difference between a maximum value and a minimum value of the feature of the corresponding single component in the obtained principal axis direction is calculated. If the number of single components is denoted by $N_p$ and the number of dimensions in the principal axis direction is denoted by $N_m$, then $N_p \times N_m$ ratios of the differences between the maximum value and the minimum value are calculated. Then, a sum of the ratios of the differences between the maximum value and the minimum value is calculated for each of the principal axis directions, and the calculated sum is used as a distribution degree. Eventually, $N_m$ distribution degrees are calculated ($N_m$ is the number of dimensions in the principal axis direction).

Figure 4:
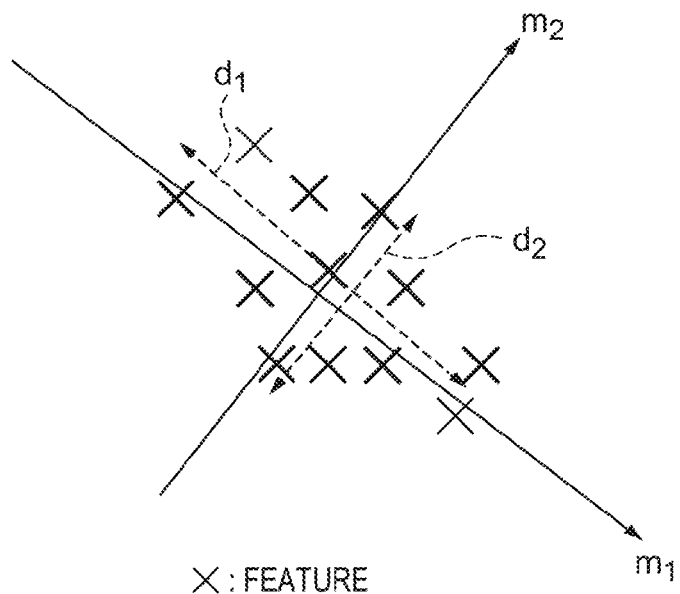
FIG. 4 is a diagram showing a distribution of features.

As an example, a description will be given of a case where the feature is an edge detected from an image. The position, on the image, of each edge observed with a viewpoint targeted for evaluation is set to $p_i = (p_{ix}, p_{iy})^t$. The principal axes are determined by performing eigenvalue decomposition of a matrix $M = [p_1, p_2, p_3, \ldots]$ in which each edge is represented as a column vector, and obtaining the top two eigenvectors having large eigenvalues. Then, the differences between a maximum value and a minimum value of the edge positions in the determined principal axis directions are calculated. FIG. 4 schematically illustrates principal axis directions $m_1$ and $m_2$ and an example in which the differences between a maximum value and a minimum value of the edge positions in the principal axis directions are $(d_1, d_2)$.

If the number of single components is denoted by $N_p$, the differences between a maximum value and a minimum value of the edge positions of single components in the principal axis directions are denoted by $(d^1{}_1, d^1{}_2) \ldots (d^{Np}{}_1, d^{Np}{}_2)$, and the differences between a maximum value and a minimum value of the edge positions of the corresponding single components in the principal axis directions in the assembled state are denoted by $(d'^1{}_1, d'^1{}_2) \ldots (d'^{Np}{}_1, d'^{Np}{}_2)$, then the distribution degree is represented by $(d^1{}_1/d'^1{}_1 + \ldots + d^{Np}{}_1/d'^{Np}{}_1, d^1{}_2/d'^1{}_2 + \ldots + d^{Np}{}_2/d'^{Np}{}_2)$, in which the sums are obtained for each of the principal axis directions.

Note that the distribution degree is not limited to the above-described example, and may be any index as long as it indicates the spatial extent of a feature. For example, the distribution degree may be calculated from the difference between a maximum value and a minimum value of a feature in an arbitrarily set direction, in place of the principal axis.

<Variation 6; Extraction is Performed in an Actual Environment>

In the first embodiment, the features are extracted based on the three-dimensional shape models held by the model information holding unit 105. However, the present invention is not limited thereto, and image information resulting from capturing an image of an actual component may be obtained, and features may be extracted based on that image information. When the captured image is a brightness image, a pixel having a difference in the luminance value with the adjacent pixel that is greater than or equal to a threshold is extracted as an edge feature. When the captured image is a range image, a pixel having a difference in the distance value with the adjacent pixel that is greater than or equal to the threshold is extracted as an edge. Note that the present invention is not limited thereto, and the feature to be extracted may be other geometric features as long as they can be extracted from the captured image. For example, the distance value stored in each pixel of a range image may be simply extracted as a feature.

<Variation 7; Evaluation Result is Displayed>

While the method for calculating an evaluation value of a viewpoint is described in the first embodiment, an evaluation value of a viewpoint may be notified to the user by further providing the information processing apparatus 101 with a user interface for displaying the result of evaluating the viewpoint. Alternatively, the information processing apparatus 101 may include a user interface for setting a viewpoint to be evaluated, and the user may use the user interface to freely set the viewpoint to be evaluated.

Note that there is no limitation on the first feature extraction unit 102 in the present invention as long as it can extract features of a component assembly observed from a viewpoint targeted for evaluation. As described in the first embodiment, the features of the component assembly to be observed from the viewpoint targeted for evaluation may be extracted based on a shape model of the component assembly. Alternatively, as described in Variation 6, the features of the component assembly to be observed from the viewpoint targeted for evaluation may be extracted based on a captured image of the component assembly.

In addition, there is no limitation on the second feature extraction unit 103 in the present invention as long as it can extract the features of single components observed from a viewpoint targeted for evaluation or from a viewpoint in the vicinity thereof. As described in the first embodiment, the features of single components observed from a viewpoint targeted for evaluation or a viewpoint in the vicinity thereof may be extracted based on shape models of the single components. Alternatively, as described in Variation 6, the features of single components observed from a viewpoint targeted for evaluation or a viewpoint in the vicinity thereof may be extracted based on captured images of the single components.

In addition, there is no limitation on the evaluation value calculation unit 104 in the present invention as long as it can calculate an evaluation value indicating a degree to which the three-dimensional position and orientation of single components can be defined. As described in the first embodiment, the visibility indicating a degree to which single components can be observed may be calculated as an evaluation value. Alternatively, as described in Variation 5, the distribution degree indicating a degree of the spatial extent of features extracted from single components may be calculated as an evaluation value.

According to the first embodiment, the viewpoint for inspecting the assembled state of the component assembly can be evaluated by using the visibility calculated based on the ratio of the number of features of single components in an assembled state that are extracted with the viewpoint to the number of features of the corresponding single components that are extracted with the viewpoint. In addition, a viewpoint for inspecting the assembled state of a component assembly can be evaluated by using the distribution degree calculated based on the ratio of the degree of extent of the features of single components in the assembled state to the degree of extent of features of the corresponding single components. Accordingly, it is possible to determine a viewpoint suitable for assembly inspection for a component assembly even in the case where concealment between the components occurs.

Second Embodiment

A Viewpoint with which the Visibility is Maximized is Used

In the second embodiment, a description will be given of a method for determining a viewpoint most suitable for inspection from among a plurality of viewpoint candidates by using an evaluation value of a viewpoint for inspecting the assembled state of a component assembly.

Figure 5:
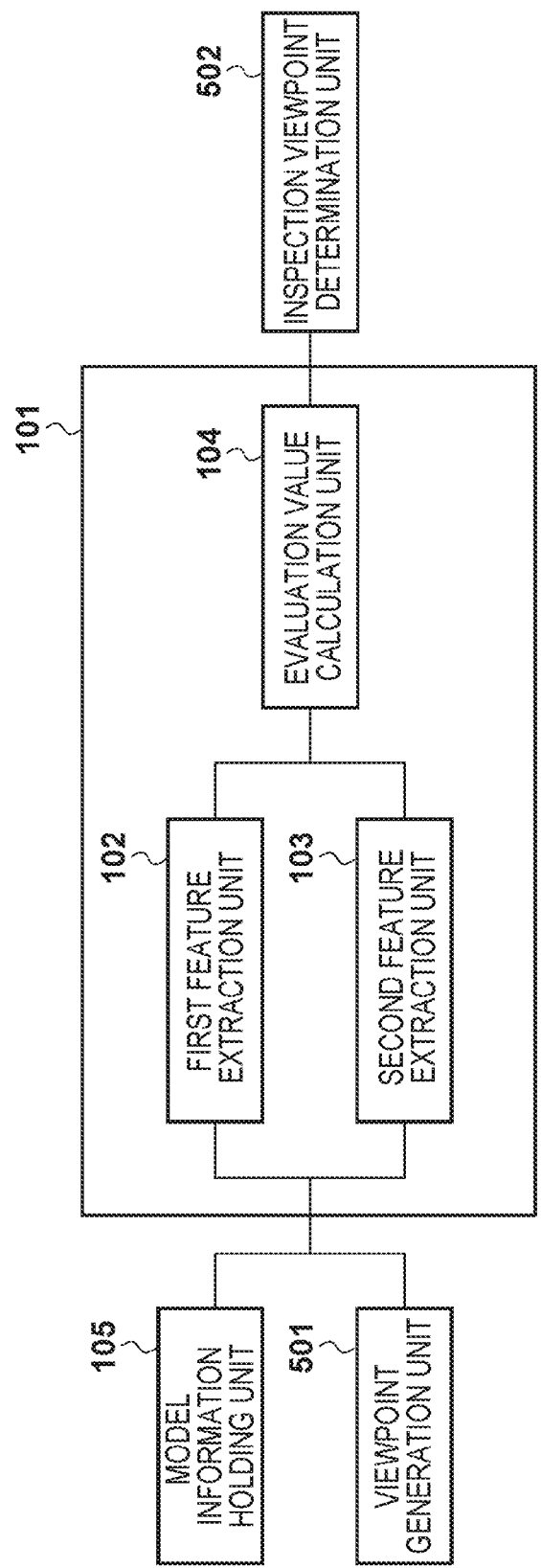
FIG. 5 is a diagram showing a configuration of an information processing system in a second embodiment.

FIG. 5 shows an exemplary configuration of an information processing system in the present embodiment. An information processing apparatus 101 includes a first feature extraction unit 102, a second feature extraction unit 103, and an evaluation value calculation unit 104.

A model information holding unit 105, a viewpoint generation unit 501, and an inspection viewpoint determination unit 502 are provided outside of the information processing apparatus 101, and connect to the information processing apparatus 101. Note that it is also possible to adopt a configuration in which the viewpoint generation unit 501 and the inspection viewpoint determination unit 502 are provided inside of the information processing apparatus 101. The first feature extraction unit 102, the second feature extraction unit 103, and the evaluation value calculation unit 104 are the same as those described in the first embodiment, and therefore, the following description is focused on the viewpoint generation unit 501 and the inspection viewpoint determination unit 502.

Figure 6:
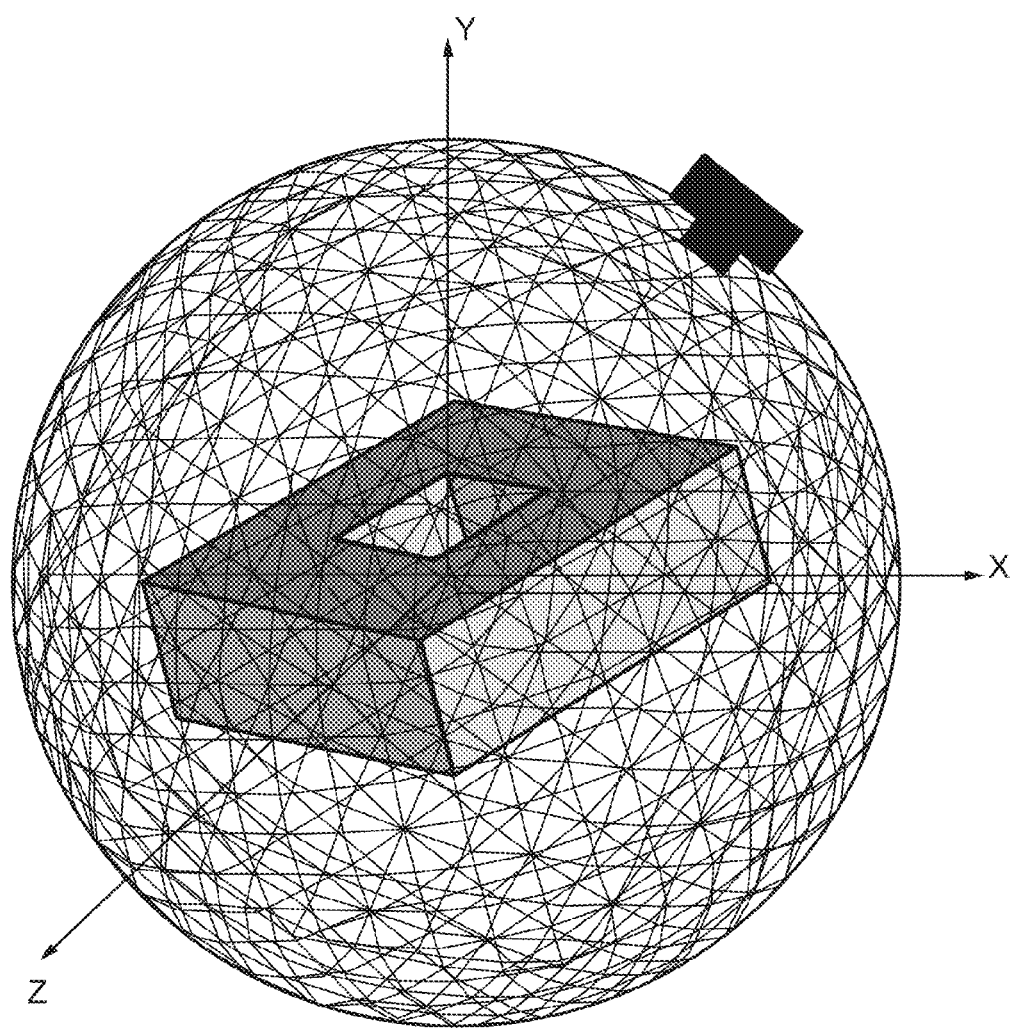
FIG. 6 is a diagram illustrating a method for setting viewpoints.

The viewpoint generation unit 501 generates a plurality of viewpoints with which a component assembly is observed. For example, as shown in FIG. 6, a sphere in which the component assembly is disposed on the origin is approximated to a polyhedron composed of equilateral triangular faces, and the midpoint of each face is used as a viewpoint position. The viewpoint direction is set to a line of sight direction in which the components are observed. Note that the present invention is not limited to this method, and any method can be used as long as it can set a plurality of viewpoints. For example, if there is a restriction on the direction in which the components are observed, only those viewpoints that may be actually observed may be set, from among the viewpoints generated in the above-described method.

The evaluation value calculation unit 104 calculates an evaluation value of a viewpoint for each viewpoint generated by the viewpoint generation unit 501. As the evaluation value, it is possible to use the visibility described in the first embodiment and Variations 2 to 4, and the distribution degree described in Variation 5. The inspection viewpoint determination unit 502 determines a viewpoint with which the evaluation value calculated in the evaluation value calculation unit 104 is maximized as an inspection viewpoint.

Next, the processing procedure of the present embodiment will be described. FIG. 7 is a flowchart illustrating the procedure of processing performed by the information processing apparatus 101 according to the present embodiment.

(Step S701)

The viewpoint generation unit 501 generates a plurality of viewpoints with which the component assembly is observed. The method for generating the viewpoints is as described above.

(Step S702)

The first feature extraction unit 102 extracts a feature from the three-dimensional shape model of the component assembly that is held by the model information holding unit 105 for each viewpoint generated by the viewpoint generation unit 501 at step S701. The method for extracting the feature is as described above.

(Step S703)

The second feature extraction unit 103 extracts a feature from the three-dimensional shape models of single components that are held by the model information holding unit 105 for each viewpoint generated by the viewpoint generation unit 501 at step S701 or each viewpoint in the vicinity thereof. The method for extracting the features is as described above.

(Step S704)

The evaluation value calculation unit 104 calculates an evaluation value of a viewpoint for each viewpoint generated by the viewpoint generation unit 501 at step S701. The method for calculating the evaluation value is as described above.

(Step S705)

The inspection viewpoint determination unit 502 determines a viewpoint with which the evaluation value of the viewpoint calculated at step S504 is maximized as an inspection viewpoint. In the case of using both the visibility and the distribution degree as the evaluation value, viewpoints having a visibility or a distribution degree greater than or equal to a preset threshold are selected first, and the viewpoint with which the distribution degree or the visibility is maximized is determined as the inspection viewpoint, from among the selected viewpoints.

As described above, the viewpoint most suitable for inspection of the assembled state of the component assembly can be determined by executing a series of processing from steps S701 to S705.

According to the second embodiment, the evaluation value of a viewpoint for inspecting the assembled state of the component assembly is calculated, and the viewpoint most suitable for inspection can be determined based on this evaluation value.

<Variation 8>

In the second embodiment, the viewpoint with which the evaluation value of a viewpoint is maximized is determined as the inspection viewpoint from among the viewpoints generated by the viewpoint generation unit 501. However, the present invention is not limited thereto, and it is possible to use other methods as long as they can determine the inspection viewpoint from among the viewpoints generated by the viewpoint generation unit 501.

For example, viewpoints having a high viewpoint evaluation value are notified to the user as viewpoint candidates via the user interface included in the information processing apparatus 101, and the user may freely select the inspection viewpoint from among the presented viewpoint candidates via the user interface included in the information processing apparatus 101. A viewpoint having a high viewpoint evaluation value refers to a viewpoint having an evaluation value greater than or equal to an average value obtained from the evaluation values of all viewpoints. Alternatively, the number of candidates may be set in advance, and that number of top viewpoint candidates having a high evaluation value may be used. There is no limitation on the method for extracting the viewpoint candidates as long as it can extract viewpoints having a higher evaluation value.

Third Embodiment

A Combination of Viewpoints is Determined

In the second embodiment, a description is given of the method in which a single viewpoint is determined as the inspection viewpoint. However, due to the shape of components, concealment between components, and so forth, there are cases where the assembled state cannot be judged from the result of observing the component assembly by using a single viewpoint. In such a case, it is necessary to integrate the results of observing the component assembly by using a plurality of viewpoints, and judge the assembled state from the integrated result.

In the third embodiment, assuming that the assembled state of a component assembly is inspected by estimating the three-dimensional position and orientation of each single component, a description will be given of a method for determining a combination of viewpoints that enables estimation of the three-dimensional position and orientation of all single components.

Figure 9:
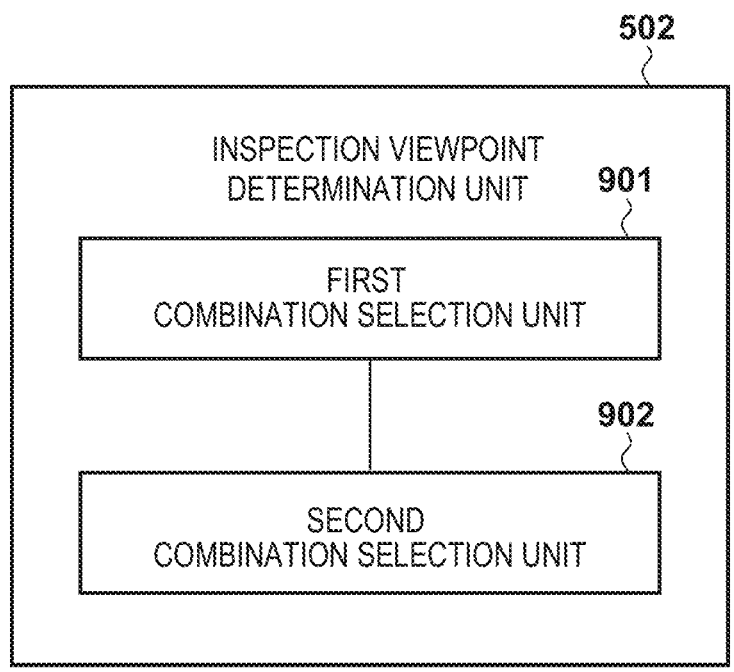
FIG. 9 is a diagram showing a configuration of an inspection viewpoint determination unit in the third embodiment.

FIG. 9 is a diagram showing the configuration of an inspection viewpoint determination unit 502 in the present embodiment. The inspection viewpoint determination unit 502 includes a first combination selection unit 901 and a second combination selection unit 902.

The first combination selection unit 901 selects viewpoints for assembly inspection based on a sum of the evaluation values of viewpoints. Specifically, the first combination selection unit 901 calculates combinations of viewpoints where a sum of the evaluation values of the viewpoints is greater than or equal to a preset threshold. As an example, a description will be given of a case where three viewpoints such as viewpoints $V_1$, $V_2$, and $V_3$ are present. As combinations of the viewpoints, $(V_1, V_2)$, $(V_2, V_3)$, $(V_3, V_1)$, and $(V_1, V_2, V_3)$ are obtained. If the evaluation values of the viewpoints are denoted by $E_1$, $E_2$, and $E_3$, respectively, the sum totals of the visibilities of the combinations are expressed as $E_1+E_2$, $E_2+E_3$, $E_3+E_1$, and $E_1+E_2+E_3$.

Where T is the threshold, if $E_1+E_2>T$, $E_2+E_3>T$, $E_3+E_1<T$, and $E_1+E_2+E_3>T$, then the combinations $(V_1, V_2)$, $(V_2, V_3)$, and $(V_1, V_2, V_3)$ are selected as the viewpoints for assembly inspection. Note that an upper limit may be set in advance for the number of combinations of viewpoints. For example, when the upper limit of the number of viewpoints is set to 2, the combination $(V_1, V_2, V_3)$ is excluded, and the combinations $(V_1, V_2)$ and $(V_2, V_3)$ are selected as the viewpoints for assembly inspection.

The second combination selection unit 902 selects, from among the combinations of viewpoints selected by the first combination selection unit 901, a combination of viewpoints that is suitable as the viewpoints for assembly inspection, in terms of the number of viewpoints and the distance between viewpoints. Specifically, the second combination selection unit 902 selects a combination of viewpoints where the number of viewpoints is minimized, or a combination of viewpoints where the sum total of the distance between the viewpoints is minimized. Note that the selection may be performed by other methods as long as they enable selection of combination of viewpoints suitable for inspection in terms of the number of viewpoints and the distance between viewpoints. For example, a combination of viewpoints where the maximum value of the distance between viewpoints is minimized may be selected.

Next, the processing procedure in the present embodiment will be described. The processing procedure described in the second embodiment differs from the processing procedure of the present embodiment only with regard to the method for determining the inspection viewpoint (Step S705), and therefore, a description will be given below only of the method for determining the inspection viewpoint.

FIG. 8 is a flowchart illustrating the processing procedure by which the inspection viewpoint determination unit 502 of the present embodiment determines the inspection viewpoint.

(Step S801)

Combinations of viewpoints for assembly inspection are selected based on the sums of the evaluation values of the viewpoints. The selection method is as described above.

(Step S802)

From among the combinations of viewpoints selected at step S801, a combination of viewpoints suitable as the viewpoint for assembly inspection is selected in terms of the number of viewpoints and the distance between the viewpoints. The selection method is as described above.

As described above, the combination of viewpoints that is most suitable for inspection can be determined by executing a series of processing from steps S701 to S704 and steps S801 to S802.

According to the third embodiment, an evaluation value of a viewpoint for inspecting the assembled state of the component assembly is calculated, and the combinations of viewpoint that is most suitable for inspection can be determined based on the evaluation value.

<Variation 9; an Example Using Only the First Combination Selection Unit 901>

In the third embodiment, the combination of viewpoints that is most suitable for inspection is calculated by using both the first combination selection unit 901 and the second combination selection unit 902. However, the combination of viewpoints that is most suitable for inspection may be calculated by using only the first combination selection unit 901. In this case, a combination of viewpoints where the sum of the evaluation values of the viewpoints is greater than or equal to a preset threshold may be used as the inspection viewpoint.

According to the present invention, it is possible to determine a viewpoint suitable for assembly inspection for a component assembly even in the case where concealment between the components occurs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-044261, filed Mar. 6, 2014, which is hereby incorporated by reference herein in its entirety.

What is claimed is:

1. An information processing apparatus comprising:
    a first feature extraction unit configured to extract, as a first feature, a feature of a component assembly in which components are assembled for each of viewpoints;
    a second feature extraction unit configured to extract a feature of the components as a second feature for each of the viewpoints;
    a derivation unit configured to derive an evaluation value for each of the viewpoints based on the first feature and the second feature; and
    a determination unit configured to determine, based on the evaluation value for each of the viewpoints, a viewpoint for inspecting an assembled state of the components,
    wherein each of the first feature extraction unit, the second feature extraction unit, the derivation unit, and the determination unit is implemented using one or more processors or one or more circuits.

2. The information processing apparatus according to claim 1, further comprising a model information holding unit configured to hold shape information of the components and the component assembly, wherein the first feature extraction unit extracts the first feature based on the shape information of the component assembly, and the second feature extraction unit extracts the second feature based on the shape information of the components, wherein the model information holding unit is implemented using one or more processors or one or more circuits.

3. The information processing apparatus according to claim 1, further comprising an obtaining unit configured to obtain image information resulting from capturing an image of the components and the component assembly, wherein the first feature extraction unit extracts the first feature based on the image information of the component assembly, and the second feature extraction unit extracts the second feature based on the image information of the components, wherein the obtaining unit is implemented using one or more processors or one or more circuits.

4. The information processing apparatus according to claim 1, wherein the first feature is a geometric feature of the component assembly, and the second feature is a geometric feature of the components.

5. The information processing apparatus according to claim 1, wherein the first feature is a size of a visible region of the component assembly, and the second feature is a size of a visible region of the components, wherein the evaluation value represents a size relationship between the size of the visible region of the component assembly and the size of the visible region of the components.

6. The information processing apparatus according to claim 1, the evaluation value indicating a degree to which three-dimensional position and orientation of the components in the assembled state can be defined.

7. The information processing apparatus according to claim 1, wherein the evaluation value is a distribution degree indicating a degree of spatial extent of a feature.

8. The information processing apparatus according to claim 1, wherein the derivation unit derives the evaluation value based on a ratio of the first feature to the second feature.

9. The information processing apparatus according to claim 1, wherein the derivation unit derives the evaluation value based on a ratio of the number of the first features to the number of the second features.

10. The information processing apparatus according to claim 1, further comprising a viewpoint generation unit configured to generate position and orientation of a plurality of viewpoints for observing the component assembly, wherein the determination unit determines a viewpoint for inspecting the assembled state of the component assembly from among the plurality of viewpoints based on the evaluation value for each of the viewpoints derived by the derivation unit, wherein the viewpoint generation unit is implemented using one or more processors or one or more circuits.

11. The information processing apparatus according to claim 10, wherein the determination unit determines a viewpoint having the highest evaluation value as the viewpoint.

12. The information processing apparatus according to claim 10, further comprising a first combination selection unit configured to select a combination of viewpoints based on a sum of the evaluation values of viewpoints derived for each of the viewpoints, wherein the determination unit determines the combination of viewpoints selected by the first combination selection unit as the viewpoint, wherein the first combination selection unit is implemented using one or more processors or one or more circuits.

13. The information processing apparatus according to claim 12, further comprising a second combination selection unit configured to select, from among combinations of viewpoints selected by the first combination selection unit, a combination of viewpoints where the number of viewpoints or the distance between viewpoints is minimized, wherein the determination unit determines the combination of viewpoints selected by the second combination selection unit as the viewpoint, wherein the second combination selection unit is implemented using one or more processors or one or more circuits.

14. A method for controlling an information processing apparatus, comprising:

extracting, as a first feature, a feature of a component assembly in which components are assembled for each of viewpoints;

extracting a feature of the components as a second feature for each of the viewpoints;

deriving an evaluation value for each of the viewpoints based on the first feature and the second feature; and determining, based on the evaluation value for each of the viewpoints, a viewpoint for inspecting an assembled state of the components.

15. A non-transitory computer-readable storage medium storing a computer program for causing a computer to execute a method for controlling an information processing apparatus, comprising:

extracting, as a first feature, a feature of a component assembly in which components are assembled for each of viewpoints;

extracting a feature of the components as a second feature for each of the viewpoints;

deriving an evaluation value for each of the viewpoints based on the first feature and the second feature; and determining, based on the evaluation value for each of the viewpoints, a viewpoint for inspecting an assembled state of the components.

* * * * *